(12) United States Patent
Wu (10) Patent No.: US 10,414,122 B2
(45) Date of Patent: Sep. 17, 2019

(54) LOW-STRESS LINE WORKPIECE AND METHOD FOR INTEGRALLY FORMING THE SAME

(71) Applicants: INTERFACE TECHNOLOGY (CHENGDU) CO., LTD., Chengdu (CN); INTERFACE OPTOELECTRONICS (SHENZHEN) CO., LTD., Shenzhen (CN); GENERAL INTERFACE SOLUTION LIMITED, Miaoli County (TW)

(72) Inventor: Chin-Yang Wu, Chengdu (CN)

(73) Assignees: Interface Technology (Chengdu) Co., Ltd., Chengdu (CN); Interface Optoelectronics (Shenzhen), Shenzhen (CN); General Interface Solution Limited, Miaoli County (TW)

(*) Notice: Subject to any disclaimer, the term of this patent is extended or adjusted under 35 U.S.C. 154(b) by 121 days.

(21) Appl. No.: 15/459,409

(22) Filed: Mar. 15, 2017

(65) Prior Publication Data

US 2018/0200928 A1    Jul. 19, 2018

(30) Foreign Application Priority Data

Jan. 16, 2017   (CN) .......................... 2017 1 0028484

(51) Int. Cl.
*B32B 7/02*      (2019.01)
*B32B 27/36*     (2006.01)
(Continued)

(52) U.S. Cl.
CPC .......... *B32B 7/02* (2013.01); *B29C 45/14811* (2013.01); *B32B 27/365* (2013.01);
(Continued)

(58) Field of Classification Search
CPC ..... G06F 3/00; G06F 3/041; B32B 2457/208; B32B 27/365; B32B 2333/12; B32B 7/02; G02B 1/10; G02B 1/14
See application file for complete search history.

(56) References Cited

U.S. PATENT DOCUMENTS

2016/0196894 A1*  7/2016  Matsuda ............... B32B 27/308
                                                442/1
2016/0306451 A1* 10/2016  Isoda ...................... G06F 3/041

FOREIGN PATENT DOCUMENTS

WO    WO-2014088058 A1 *  6/2014  ........... B32B 27/308

* cited by examiner

*Primary Examiner* — Catherine A. Simone
(74) *Attorney, Agent, or Firm* — Rosenberg, Klein & Lee (57) ABSTRACT

A low-stress line workpiece and a method for integrally forming the same is disclosed. Firstly, an in-mold injection molding mold is provided, wherein a function film, a 3D curved-surface plastic material, and an anti-rainbow stripe combination layer are placed in the in-mold injection molding mold. The in-mold injection molding mold is used to mold the function film, the plastic material and the combination layer into a low-stress line workpiece integrally formed by in-mold forming. The low-stress line workpiece includes the function film, the plastic layer and the combination layer, wherein the plastic layer is located between the function film and the combination layer. The present invention provides a low-stress line workpiece with high surface hardness and a method for forming the same to reduce lamination fabrication processes and improve lamination yield.

1 Claim, 12 Drawing Sheets (51) Int. Cl.
  *G06F 3/00* (2006.01)
  *B29C 45/14* (2006.01)
  *B29L 31/30* (2006.01)
  *B29K 69/00* (2006.01)
  *B29K 633/04* (2006.01)
  *B29K 669/00* (2006.01)
  *B29L 31/34* (2006.01)
(52) U.S. Cl.
  CPC ............ *G06F 3/00* (2013.01); *B29K 2069/00* (2013.01); *B29K 2633/12* (2013.01); *B29K 2669/00* (2013.01); *B29K 2995/007* (2013.01); *B29K 2995/0018* (2013.01); *B29L 2031/30* (2013.01); *B29L 2031/3475* (2013.01); *B32B 2333/12* (2013.01); *B32B 2457/208* (2013.01)

LOW-STRESS LINE WORKPIECE AND METHOD FOR INTEGRALLY FORMING THE SAME

This application claims priority for China patent application no. 201710028484.4 filed on Jan. 16, 2017, the content of which is incorporated by reference in its entirely.

BACKGROUND OF THE INVENTION

Field of the Invention

The present invention relates to a workpiece of a vehicular cover and a method for forming the same, particularly to a low-stress line workpiece and a method for integrally forming the same.

Description of the Related Art

Most of the new types of vehicles are installed with vehicular touch modules, which are provided to drivers for controlling vehicular hosts. Thus, in order to endure impact, a cover of the touch module is very important. The cover has to possess sufficient hardness to protect various electrical elements.

Continuing from the abovementioned paragraph, in order to endure impact, the cover is made of polycarbonate (PC) and injection-molded to improve hardness of its surface. However, the optical lens made of polycarbonate easily forms stress lines such as rainbows. Since a laminated surface of the optical lens made of PC has insufficient hardness, the laminated surface is easily scraped when performing in-mold forming (IMF) process.

Figure 1:
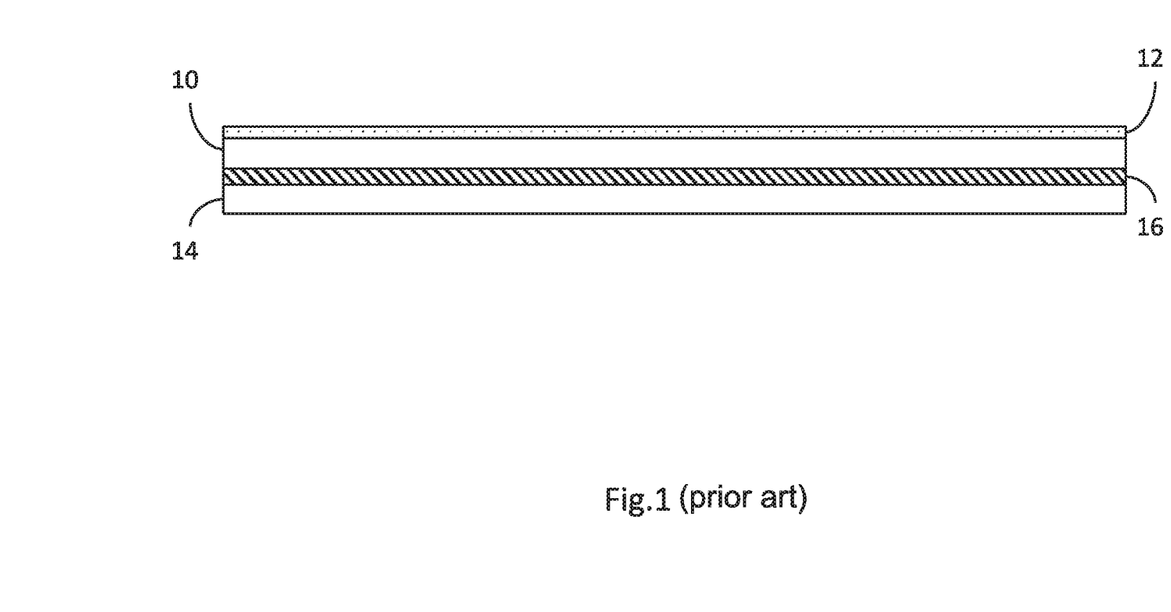
FIG. 1 is a diagram schematically showing a three-dimension (3D) cover in a conventional technology.
Figure 2:
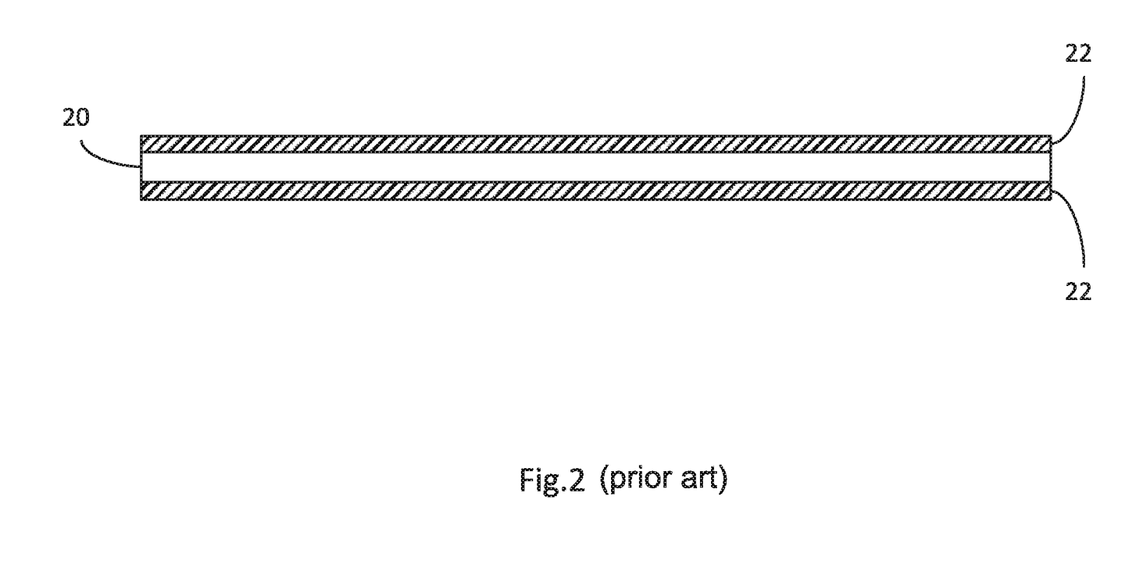
FIG. 2 is a diagram schematically showing another three-dimension (3D) cover in a conventional technology.

Accordingly, as shown in FIG. 1, after a three-dimension (3D) cover 10 is produced by injection molding, a function film 12 is formed on the 3D cover 10. When the 3D cover 10 and the function film 12 are assembled and laminated in a touch module factory, a retardation adjustment film 16 is formed on a touch module 14 to suppress rainbow stripes of the 3D cover 10. Some factories use polycarbonate or polymethylmethacrylate (PMMA) to produce composite boards by an extrusion process. The composite board is like retardation adjustment film 16 to suppress rainbow stripes. Alternatively, refer to FIG. 2, some factories respectively forms two hard coating layers 22 on top and bottom surfaces of a 3D cover 20 by in-mold roller (IMR), so as to improve hardness of the laminated surfaces.

However, in the abovementioned technology, a lamination process is added when laminating the touch module. The additional lamination process easily reduces the lamination yield. Alternatively, since the 3D cover has insufficient hardness, the surface of the cover is scraped during the lamination process. Although the hard coating layers are used to improve the hardness of the laminated surfaces, the technology increases the production cost and brings additional burdens to users.

To overcome the abovementioned problems, the present invention provides a low-stress line workpiece and a method for integrally forming the same, so as to solve the aforementioned problems of the prior art and to reduce the production cost.

SUMMARY OF THE INVENTION

A primary objective of the present invention is to provide a low-stress line workpiece and a method for integrally forming the same, which embeds an anti-rainbow stripe combination layer having polyethylene terephthalate (PET) or polycarbonate (PC) in polycarbonate in an in-mold fabrication process to suppress rainbow stripes (also called stress lines) formed on a cover workpiece made of polycarbonate.

Another objective of the present invention is to provide a low-stress line workpiece and a method for integrally forming the same, which uses the embedding technique to reduce a lamination fabrication process compared with the conventional cover workpiece, and improves the yield of laminating a three-dimension (3D) curved-surface plastic layer to a retardation film used to reduce stress lines.

A further objective of the present invention is to provide a low-stress line workpiece and a method for integrally forming the same, which utilizes a cover with higher surface hardness whereby the cover is not easily damaged when laminated in the back-end process, so as to improve the yield of the back-end process.

To achieve the abovementioned objectives, the present invention provides a method for integrally forming a low-stress line workpiece. Firstly, an in-mold injection molding mold is provided. Then, a function film, a three-dimension (3D) curved-surface plastic material, and an anti-rainbow stripe combination layer are placed in the in-mold injection molding mold, and the 3D curved-surface plastic material is located between the function film and the anti-rainbow stripe combination layer. Finally, the in-mold injection molding mold is used to mold the function film, the 3D curved-surface plastic material and the anti-rainbow stripe combination layer into a low-stress line workpiece integrally formed by in-mold forming (IMF).

The present invention also provides a low-stress line workpiece formed by in-mold forming, and the low-stress line workpiece comprises a three-dimension (3D) curved-surface plastic layer, a function film and an anti-rainbow stripe combination layer. The function film and the anti-rainbow stripe combination layer are respectively located on two surfaces of the 3D curved-surface plastic layer to bond the 3D curved-surface plastic layer.

In an embodiment of the present invention, the anti-rainbow stripe combination layer further comprises a hardness layer and a retardation film with one surface thereof laminated to the 3D curved-surface plastic material, and the other surface of the retardation film is provided with the hardness layer. The retardation film is a high retardation film made of polycarbonate (PC), and the 3D curved-surface plastic material comprises thermoplastic material or polycarbonate, and the hardness layer comprises polymethylmethacrylate (PMMA).

In an embodiment of the present invention, the retardation film is a super retardation film (SRF) made of polyethylene terephthalate, and the hardness layer is a hard coating layer. The anti-rainbow stripe combination layer further comprises a bonding layer located between the retardation film and the 3D curved-surface plastic material and used to bond the retardation film to the 3D curved-surface plastic material. The bonding layer is made of a binder, and the 3D curved-surface plastic material comprises thermoplastic material or polycarbonate.

In an embodiment of the present invention, after integrally forming the low-stress line workpiece, the low-stress line workpiece is further laminated to a touch module. Alternatively, in the step of placing the anti-rainbow stripe combination layer, the anti-rainbow stripe combination layer is laminated to a touch module, and then the touch module and the anti-rainbow stripe combination layer are integrally formed as one piece.

Continuing from the abovementioned paragraph, regardless of any way of laminating the touch module, the touch module is located on a surface of the anti-rainbow stripe combination layer to bond it, and the anti-rainbow stripe combination layer is located between the touch module and the 3D curved-surface plastic layer.

In an embodiment of the present invention, the in-mold injection molding mold further comprises an inner surface and a laminated surface, and the function film is located on the inner surface, and the anti-rainbow stripe combination layer is located on the laminated surface. The 3D curved-surface plastic material is placed in the in-mold injection molding mold and located between the function film and the anti-rainbow stripe combination layer.

Below, the embodiments are described in detail in cooperation with the drawings to make easily understood the technical contents, characteristics and accomplishments of the present invention.

DETAILED DESCRIPTION OF THE INVENTION

In order to improve production yield or production quality, simplify production procedure, and fabricate a workpiece with economic benefits and without the very high cost, the present invention provides a low-stress line workpiece and a method for integrally forming the same, so as to solve the afore-mentioned problems of the prior art.

Figure 3:
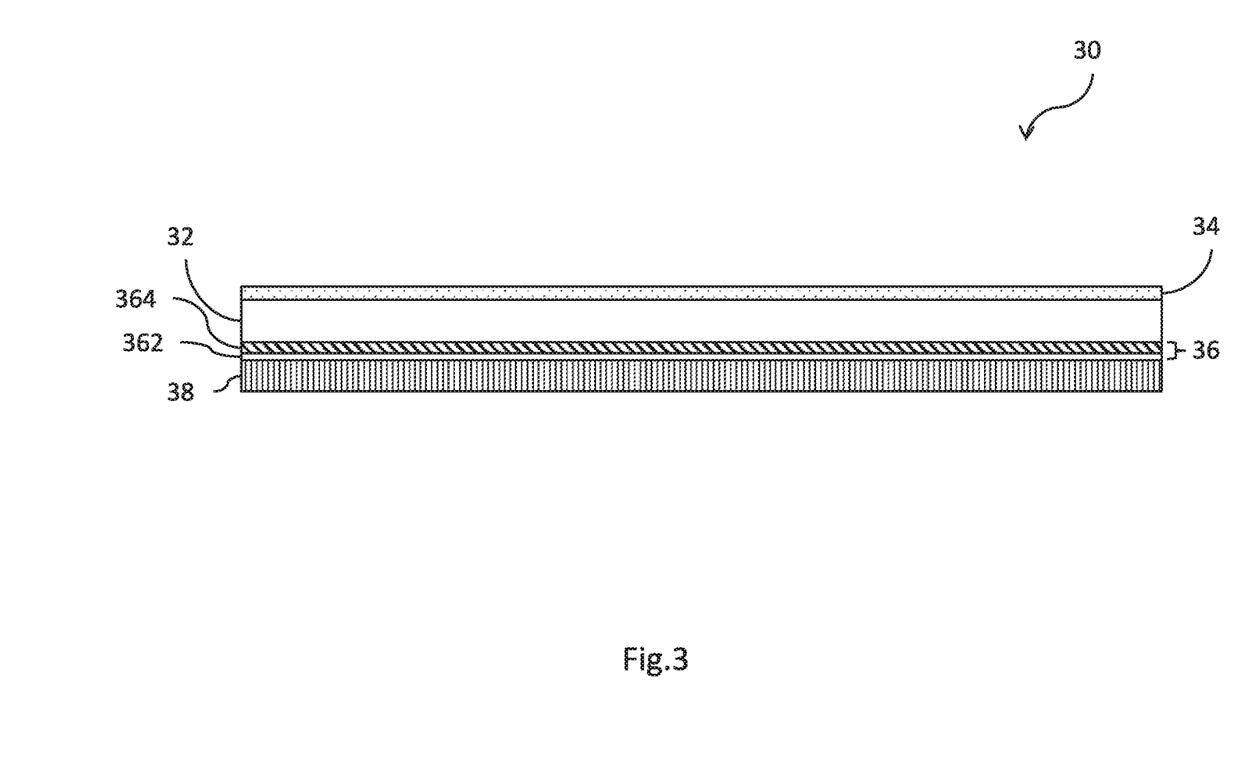
FIG. 3 is a diagram schematically showing a low-stress line workpiece according to the first embodiment of the present invention.
Figure 4:
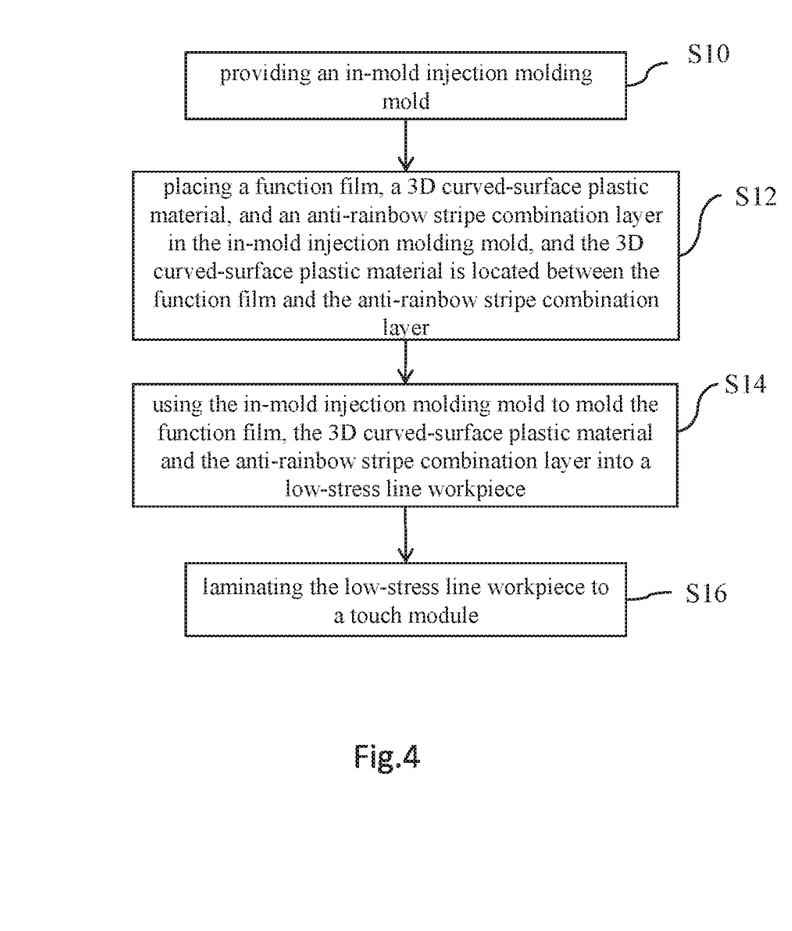
FIG. 4 is a flowchart of forming the low-stress line workpiece according to the first embodiment of the present invention.

Firstly, refer to FIG. 3. The low-stress line workpiece 30 of the present invention comprises a three-dimension (3D) curved-surface plastic layer 32, a function film 34 and an anti-rainbow stripe combination layer 36. The 3D curved-surface plastic layer 32 has a first surface and a second surface. The function film 34 is located on the first surface to bond the 3D curved-surface plastic layer 32. The anti-rainbow stripe combination layer 36 is located on the second surface to bond the 3D curved-surface plastic layer 32, and the 3D curved-surface plastic layer 32 is located between the function film 34 and the anti-rainbow stripe combination layer 36. The low-stress line workpiece 30 further comprises a touch module 38 located on a surface of the anti-rainbow stripe combination layer 36 to bond the anti-rainbow stripe combination layer 36, and the anti-rainbow stripe combination layer 36 is located between the touch module 38 and the 3D curved-surface plastic layer 32.

Besides, the anti-rainbow stripe combination layer 36 is introduced in detail. Refer to FIG. 3. The anti-rainbow stripe combination layer 36 comprises a hardness layer 362 and a retardation film 364. One surface of the retardation film 364 is bonded to the second surface of the 3D curved-surface plastic layer 32 and the other surface of the retardation film 364 is provided with the hardness layer 362. In the embodiment, the retardation film 364 is a high retardation film made of polycarbonate (PC), and the 3D curved-surface plastic layer 32 is realized with a three-dimension (3D) plastic cover comprising thermoplastic material or polycarbonate, and the hardness layer 362 comprises polymethylmethacrylate (PMMA).

Figure 5A:
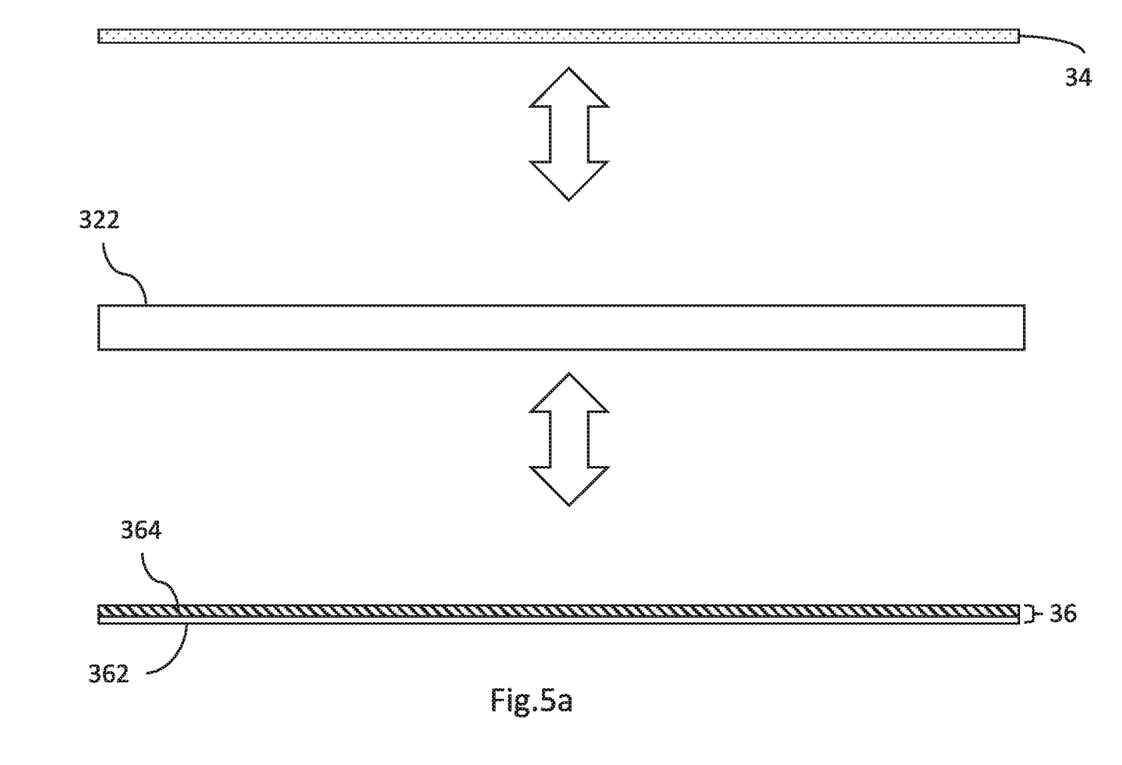
FIGS. 5a-5c are diagrams schematically showing a method for forming the low-stress line workpiece according to the first embodiment of the present invention.
Figure 5B:
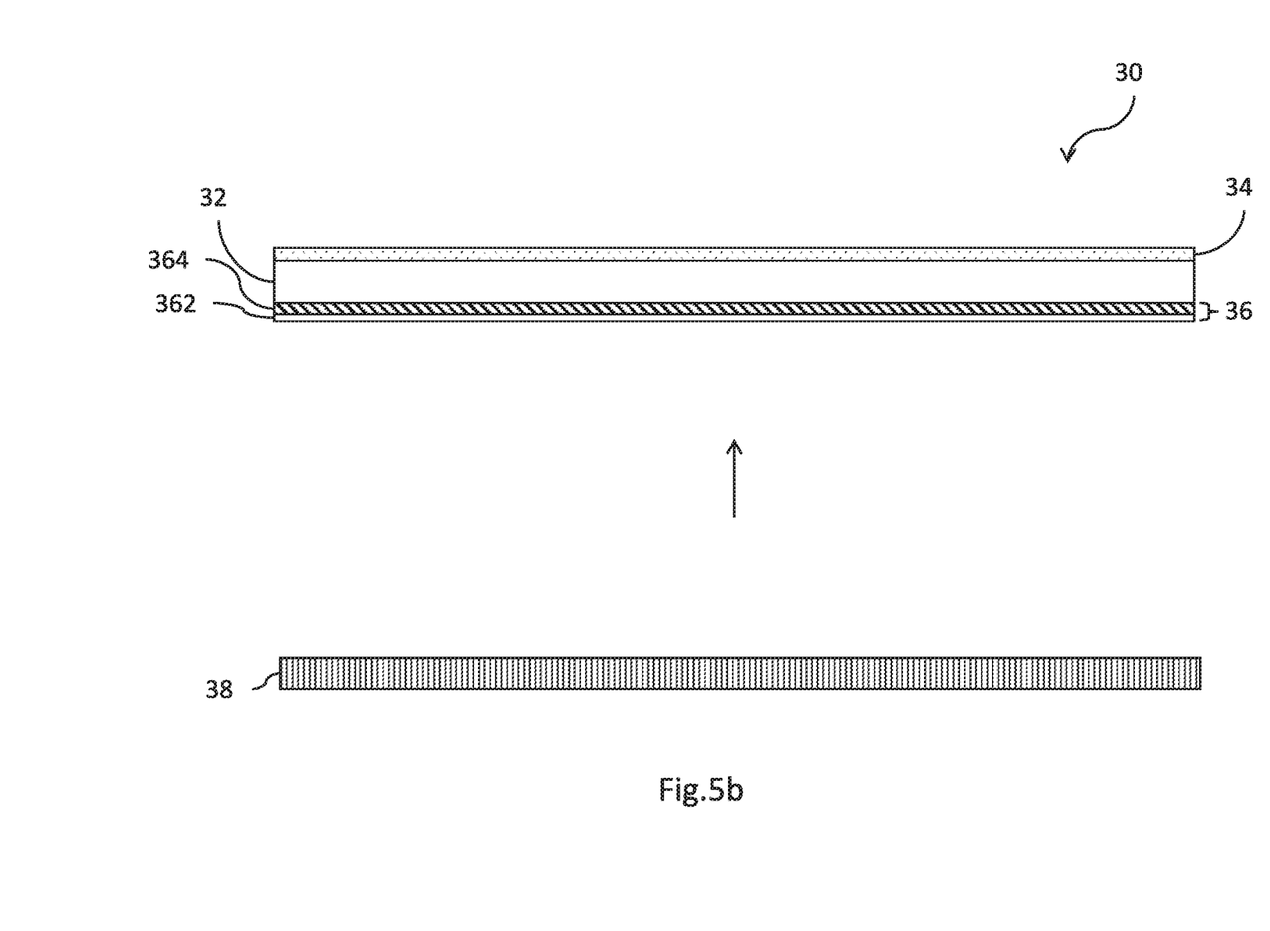
Figure 5C:
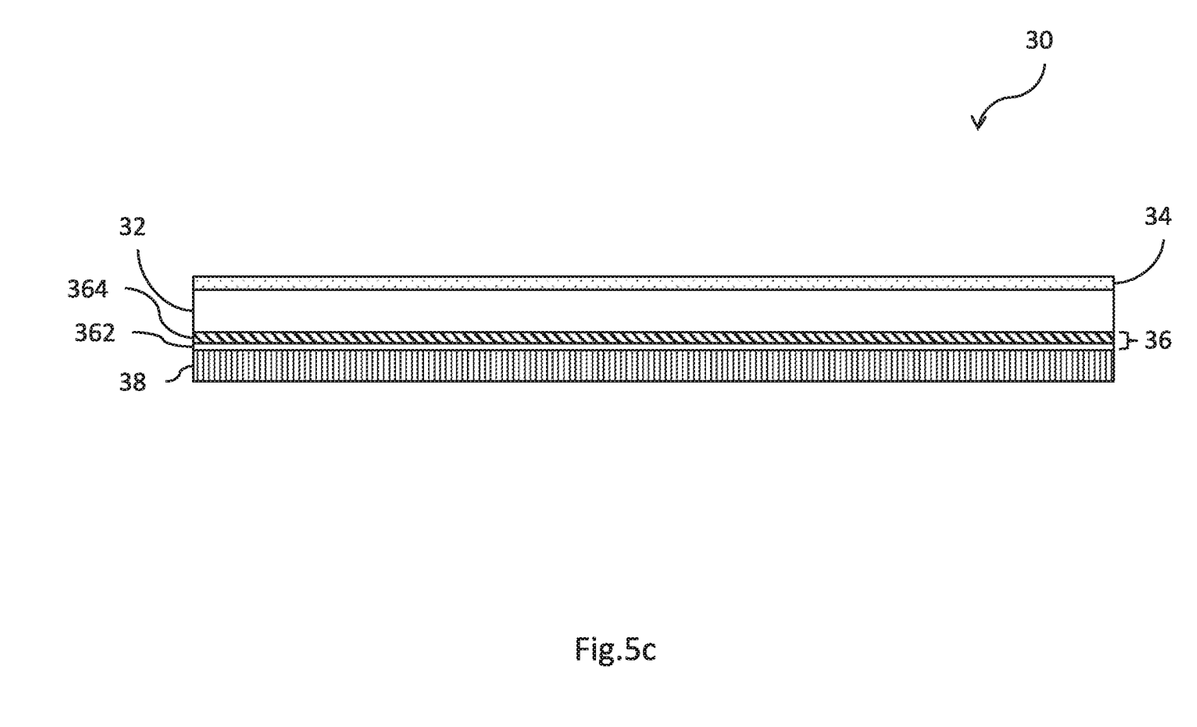

Afterward, the method for integrally forming the low-stress line workpiece is introduced. Refer to FIG. 4, FIG. 5a, FIG. 5b and FIG. 5c. Firstly, in Step S10, an in-mold injection molding mold (not shown) is provided, wherein the in-mold injection molding mold comprises an inner surface and a laminated surface. The in-mold injection molding mold is designed according to requirement of a user, but the present invention is not limited thereto. Then, in Step S12 and FIG. 5a, a function film 34, a three-dimension (3D) curved-surface plastic material 322, and an anti-rainbow stripe combination layer 36 are placed in the in-mold injection molding mold, wherein the 3D curved-surface plastic material 322 is raw material used to form the 3D curved-surface plastic layer 32, and the function film 34 is located on the inner surface, and the anti-rainbow stripe combination layer 36 is located on the laminated surface. Then, the 3D curved-surface plastic material 322 is placed in the in-mold injection molding mold, and the 3D curved-surface plastic material 322 is located between the function film 34 and the anti-rainbow stripe combination layer 36. In the embodiment, the anti-rainbow stripe combination layer 36 comprises the hardness layer 362 and the retardation film 364 laminated to the 3D curved-surface plastic material 322. Then, in Step S14 and FIG. 5b, the in-mold injection molding mold is used to mold the function film 34, the 3D curved-surface plastic material 322 and the anti-rainbow stripe combination layer 36 into a low-stress line workpiece 30 integrally formed by in-mold forming (IMF). Since the 3D curved-surface plastic layer 32 and the retardation film 364 both comprise polycarbonate, they are directly bonded together due to their material properties. The hardness layer 362 located on the other surface of the retardation film 364 is used to enhance surface hardness, and the retardation film 364 is used to suppress rainbow stripes of the low-stress line workpiece 30. In Step S16, after integrally forming the low-stress line workpiece 30, the low-stress line workpiece 30 is laminated to a touch module 38. The hardness layer 362 is laminated to the touch module 38, as shown in FIG. 5c.

Figure 6:
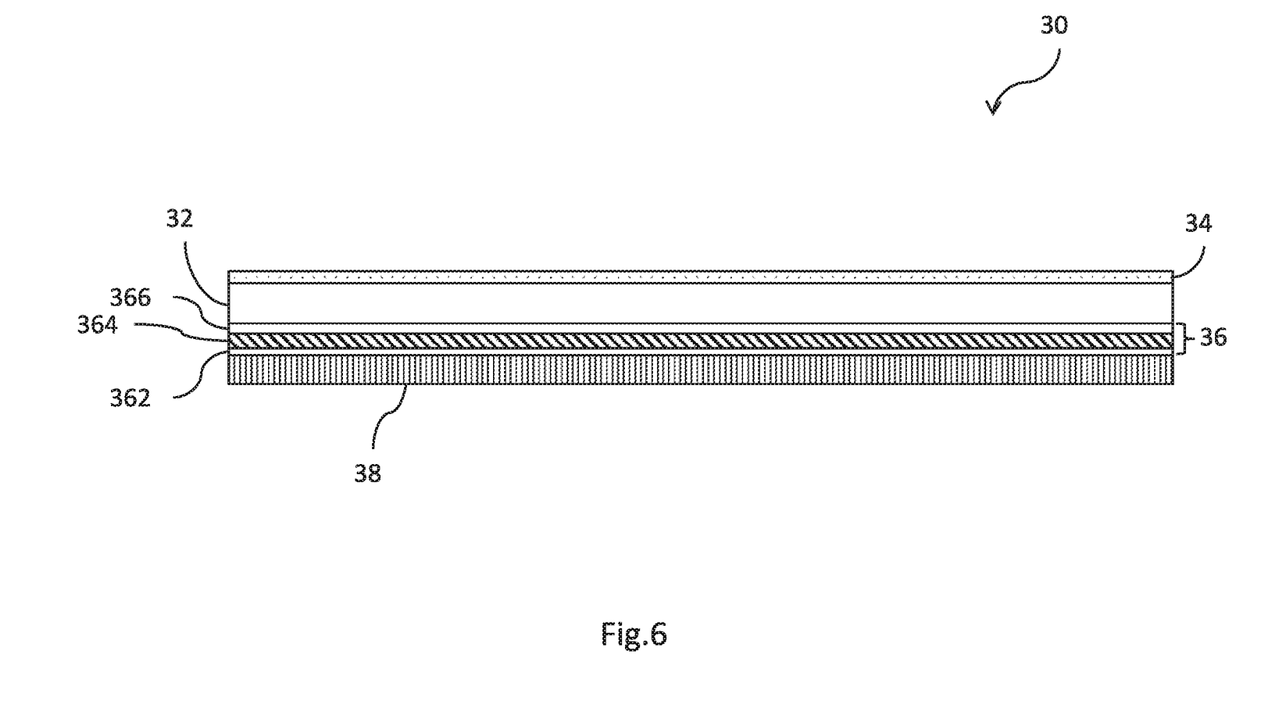
FIG. 6 is a diagram schematically showing a low-stress line workpiece according to the second embodiment of the present invention.
Figure 7:
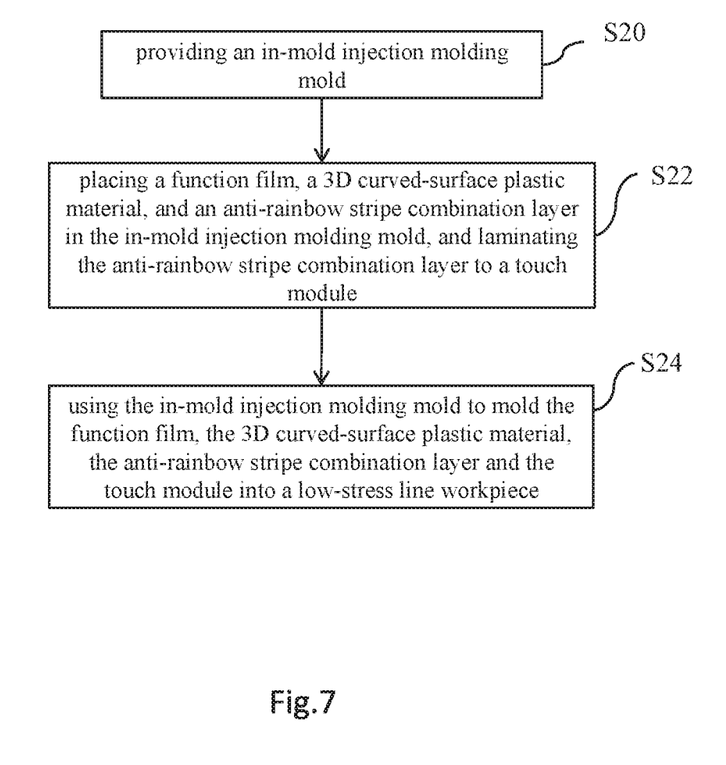
FIG. 7 is a flowchart of forming the low-stress line workpiece according to the second embodiment of the present invention.

In the abovementioned embodiment, the 3D curved-surface plastic layer and the retardation film are made of polycarbonate. The present invention provides another embodiment of the low-stress line workpiece. Refer to FIG. 6. The low-stress line workpiece 30 comprises a three-dimension (3D) curved-surface plastic layer 32, a function film 34 and an anti-rainbow stripe combination layer 36. The function film 34 and the anti-rainbow stripe combination layer 36 are bonded to the 3D curved-surface plastic layer 32, and the 3D curved-surface plastic layer 32 is located between the function film 34 and the anti-rainbow stripe combination layer 36. The anti-rainbow stripe combination layer 36 comprises a hardness layer 362, a retardation film 364 and a bonding layer 366. The bonding layer 366 is located between the retardation film 364 and the 3D curved-surface plastic layer 32 and used to bond the retardation film 364 to the 3D curved-surface plastic layer 32. Thus, one surface of the retardation film 364 is bonded to one surface of the 3D curved-surface plastic layer 32, and the other surface of the retardation film 364 is bonded to the hardness layer 362. The hardness layer 362 is laminated to the touch module 38. In the embodiment, the 3D curved-surface plastic layer 32 comprises thermoplastic material or polycarbonate, and the retardation film 364 is a super retardation film (SRF) made of polyethylene terephthalate. Since polycarbonate cannot be directly bonded to polyethylene terephthalate, the bonding layer 366 made of a binder is required. The hardness layer 362 is a hard coating layer.

Figure 8A:
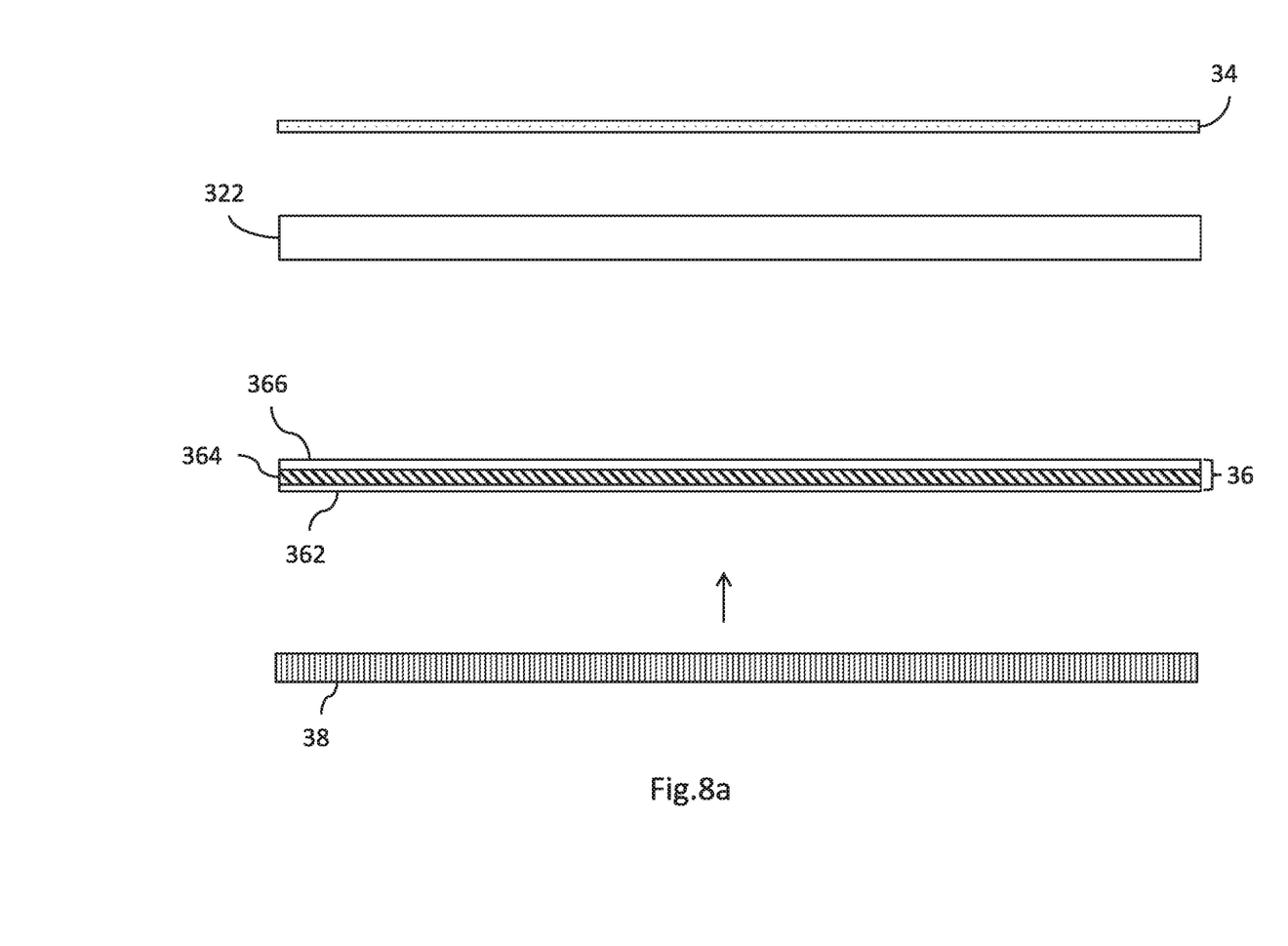
FIGS. 8a-8c are diagrams schematically showing a method for forming the low-stress line workpiece according to the second embodiment of the present invention.
Figure 8B:
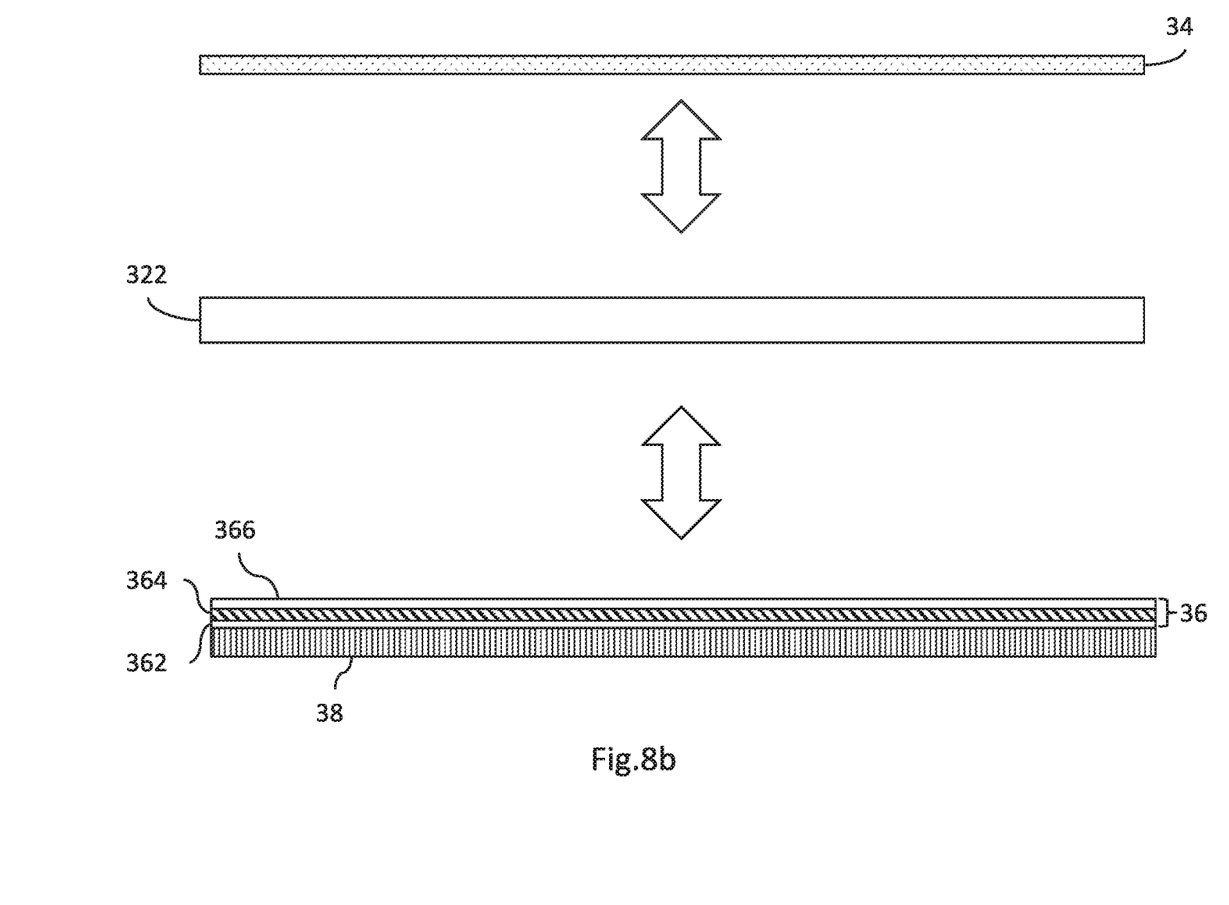
Figure 8C:
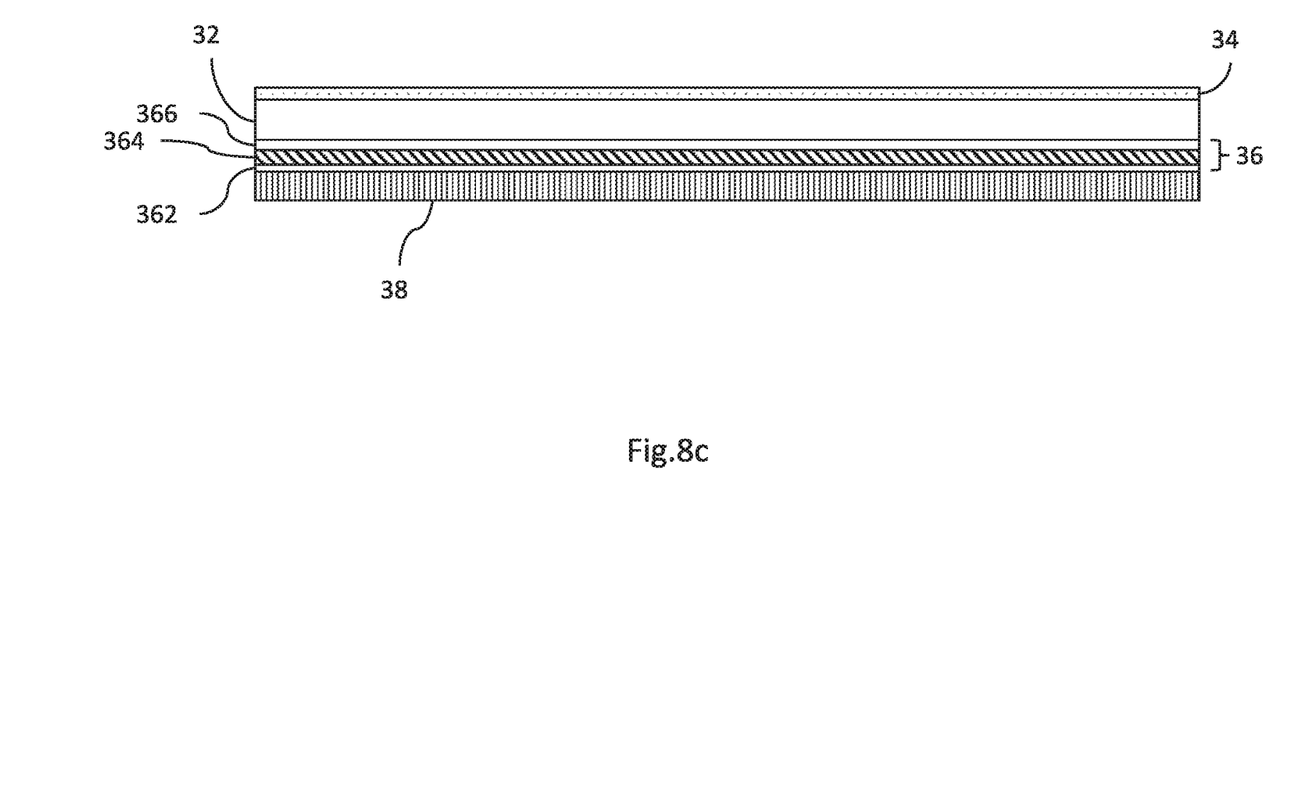

The method for integrally forming the low-stress line workpiece in FIG. 6 is identical to the method for integrally forming the low-stress line workpiece in FIG. 3. Besides, the present invention provides another method for integrally forming the low-stress line workpiece for reference. Refer to FIG. 7, FIG. 8a, FIG. 8b and FIG. 8c. Firstly, in Step S20, an in-mold injection molding mold (not shown) is provided, wherein the in-mold injection molding mold comprises an inner surface and a laminated surface. The in-mold injection molding mold is designed according to requirement of a user, but the present invention is not limited thereto. Then, in Step S22 and FIG. 8a, a function film 34, a 3D curved-surface plastic material 322, and an anti-rainbow stripe combination layer 36 are placed in the in-mold injection molding mold, wherein the 3D curved-surface plastic material 322 is raw material used to form the 3D curved-surface plastic layer 32, and the function film 34 is located on the inner surface, and the anti-rainbow stripe combination layer 36 is located on the laminated surface. In addition, the touch module 38 is laminated to the anti-rainbow stripe combination layer 36, and the touch module 38 and the anti-rainbow stripe combination layer 36 are placed in the in-mold injection molding mold. In the embodiment, the anti-rainbow stripe combination layer 36 comprises the hardness layer 362, the retardation film 364 and the bonding layer 366. In this time, the touch module 38 is laminated to the hardness layer 362. Since the raw material of the retardation film 364 is different from that of the 3D curved-surface plastic material 322, the 3D curved-surface plastic material 322 cannot be directly bonded to the retardation film 364. As a result, the retardation film 364 is bonded to the 3D curved-surface plastic material 322 through the bonding layer 366. Then, the 3D curved-surface plastic material 322 is placed in the in-mold injection molding mold, such that the 3D curved-surface plastic material 322 is located between the function film 34 and the anti-rainbow stripe combination layer 36. Then, in Step S24 and FIG. 8b, the in-mold injection molding mold is used to mold the function film 34, the 3D curved-surface plastic material 322, the anti-rainbow stripe combination layer 36 and the touch module 38 into a low-stress line workpiece 30 integrally formed by in-mold forming (IMF), as shown in FIG. 8c.

Therefore, the present invention can perform the method for integrally forming the low-stress line workpiece regardless of any raw material. The low-stress line workpiece is integrally formed as one piece and then laminated to the touch module. Alternatively, the touch module is laminated to the anti-rainbow stripe combination layer, and then integrally formed as one piece. On top of that, the present invention can reduce a lamination fabrication process for laminating the retardation film. The present invention embeds the retardation film so that the retardation film and the 3D curved-surface plastic layer are directly formed by IMF, so as to suppress the rainbow stripes of the 3D curved-surface plastic layer. Additionally, since the hardness layer is laminated to the retardation film, the hardness layer is used to enhance the surface hardness and lamination yield when the retardation film is laminated to the touch module.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A low-stress line workpiece formed by in-mold forming, and said low-stress line workpiece comprising:
   a three-dimension (3D) curved-surface plastic layer having a first surface and a second surface, and the 3D curved-surface plastic layer comprises polycarbonate;
   a function film located on said first surface to bond said 3D curved-surface plastic layer;
   an anti-rainbow stripe combination layer located on said second surface to bond said 3D curved-surface plastic layer, and said 3D curved-surface plastic layer is located between said function film and said anti-rainbow stripe combination layer, wherein said anti-rainbow stripe combination layer further comprises:
      a hardness layer;
      a super retardation film with one surface thereof bonded to said second surface of said 3D curved-surface plastic layer, another surface of said retardation film is provided with said hardness layer, and the super retardation film is made of polyethylene terephthalate; and
      a bonding layer located between said super retardation film and said second surface of said 3D curved-surface plastic layer and used to bond said super retardation film to said 3D curved-surface plastic layer; and
   a touch module located on a surface of said hardness layer to bond said hardness layer, and said hardness layer, said super retardation film, and said bonding layer are located between said touch module and said 3D curved-surface plastic layer.

* * * * *